United States Patent
Eslambolchi et al.

(10) Patent No.: US 6,882,283 B1
(45) Date of Patent: Apr. 19, 2005

(54) CABLE PLOW INSTALLATION MONITOR METHOD AND APPARATUS

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 214 days.

(21) Appl. No.: 10/158,237

(22) Filed: May 29, 2002

(51) Int. Cl.[7] .............................................. G08B 21/00
(52) U.S. Cl. .............................. 340/686.5; 340/686.2; 340/686.6; 340/988; 701/50; 701/200; 701/300; 37/381
(58) Field of Search ........................... 340/572.1, 425.5, 340/988, 995.1, 684, 685, 686.1, 686.6; 701/50; 37/348, 366, 413, 414

(56) References Cited

U.S. PATENT DOCUMENTS

| | | | |
|---|---|---|---|
| 3,754,247 A | * | 8/1973 | Hansford ...................... 342/23 |
| 3,907,136 A | * | 9/1975 | Christides et al. .......... 414/694 |
| 4,006,481 A | * | 2/1977 | Young et al. ................ 343/770 |
| 4,231,093 A | * | 10/1980 | LaVance et al. ............ 701/300 |
| 4,334,217 A | * | 6/1982 | Nield et al. .................. 340/685 |
| 4,821,192 A | * | 4/1989 | Taivalkoski et al. .......... 701/25 |
| 4,835,691 A | * | 5/1989 | Rotem et al. ................. 701/23 |
| 5,050,771 A | * | 9/1991 | Hanson et al. ................. 222/1 |
| 5,116,654 A | * | 5/1992 | Cosman et al. .............. 428/77 |
| 5,198,800 A | * | 3/1993 | Tozawa et al. ........... 340/573.1 |
| 5,557,258 A | * | 9/1996 | Eslambolchi ............... 340/540 |
| 5,592,092 A | * | 1/1997 | Mechler ...................... 324/326 |
| 5,684,476 A | * | 11/1997 | Anderson ................... 340/988 |
| 5,711,022 A | * | 1/1998 | Steenwyk ..................... 701/50 |
| 5,720,354 A | * | 2/1998 | Stump et al. ................. 175/26 |
| 5,734,167 A | * | 3/1998 | Skelly ..................... 250/458.1 |
| 5,920,194 A | * | 7/1999 | Lewis et al. ................ 324/326 |
| 6,038,496 A | * | 3/2000 | Dobler et al. ................... 701/3 |
| 6,049,279 A | * | 4/2000 | Minarovic ............... 340/572.8 |
| 6,204,772 B1 | * | 3/2001 | DeMay et al. ........... 340/686.1 |
| 6,271,667 B1 | * | 8/2001 | Minarovic .................. 324/326 |
| 6,300,737 B1 | * | 10/2001 | Bergvall et al. ............. 318/580 |
| 6,407,674 B1 | * | 6/2002 | Gallagher .................... 340/905 |
| 6,487,481 B1 | * | 11/2002 | Tanaka et al. ................ 701/41 |
| 6,532,409 B1 | * | 3/2003 | Fujishima et al. ............ 701/50 |
| 6,690,278 B1 | * | 2/2004 | Ziolkowski et al. ..... 340/572.1 |

* cited by examiner

*Primary Examiner*—Benjamin C. Lee
(74) *Attorney, Agent, or Firm*—Hoffman & Baron, LLP

(57) ABSTRACT

The present invention is directed to a method and apparatus for installing a utility conveyance. A tractor which includes sensors, a plow locator and a monitor system is presented. The sensors are used to locate demarcation points, which identify the boundaries of a right way or a preexisting utility conveyance. The plow locator is used to determine the location of a plow relative to a preexisting utility conveyance. Sensing information produced by the sensors and plow location information produced by the plow locator are communicated to the monitor system. A visual representation of the demarcation points and the position of the plow relative to the demarcation points is displayed on a screen associated with the monitor system. As such, a tractor operator may navigate an engineered path and install a utility conveyance.

7 Claims, 3 Drawing Sheets

CABLE PLOW INSTALLATION MONITOR METHOD AND APPARATUS

BACKGROUND OF THE INVENTION

1. Field of the Invention

This invention relates to infrastructure. Specifically, the present invention relates to cable infrastructure.

2. Description of the Related Art

Public and private utility companies include power companies, cable companies, communications companies, etc. These companies typically provide their services through an infrastructure. The infrastructure includes termination hardware and links between the various pieces of termination hardware. The links between the hardware may extend through the air, across the ocean or on land (e.g. terrestrial links). Terrestrial links are typically implemented using cables. For example, copper cables; fiber-optic cables or coaxial cables are all common. In addition, the cables may be housed in a protective covering such as a pipe or ductwork. The cable itself or the cable housed in the protective covering, may be referred to as a utility conveyance.

Typically, a utility conveyance extends between utility company junction points or termination points. The utility company may need to get permission to extend the utility conveyance from various local government agencies, from property owners, etc. The permission to extend the utility conveyance over various areas of land is typically referred to as a right of way. The right of way in this context is an area over which a company has received permission to extend a utility conveyance.

In conventional installations, a company installing a utility conveyance will be given right of way information. For example, if a utility conveyance includes fiber-optic cable, a pathway would be designated for laying the fiber-optic cable. Several companies may install a utility conveyance along a specific right of way. Therefore, during installation, a utility company does not only have to be aware of the utility conveyance that they are installing, but must also be aware of any other utility conveyance that may be in the area of the right of way.

In a conventional operation, a tractor is used for installing a utility conveyance. The tractor has a large earth digging mechanism (e.g. plow) that digs a trench that will house the utility conveyance. In some implementations, the pipes or ductwork which comprise the utility conveyance are laid first and the cable is then pulled through the pipes.

The plow is typically located in the front of the tractor and operates on several hundred horsepower. Therefore it is very easy for the plow to cut through difficult terrain and dig the trench. As mentioned earlier, there may be a preexisting utility conveyance buried on the right of way. Given the power of the plow, a preexisting utility conveyance may be easily cut or severed by the plow, during plow operation. Cutting a preexisting utility conveyance results in a tremendous cost in terms of down time, materials and financial liability if a different company owns the severed utility conveyance.

Currently, in an attempt to avoid such a mishap, markers are placed throughout the right of way. Small colored flags typically denote the markers. In a typical cable plow operation, the right of way is first explored and any preexisting utility conveyance (e.g. all cables and ducts), that are in the area of the right of way, are identified. The markers are then placed in locations, which identify the utility conveyance along the right of way. As such, the tractor operator may avoid any preexisting utility conveyance.

The markers are placed in advance of the plowing operation or may be left over from a previous plowing operation. As such, the markers may be removed over time. In addition, if the markers are placed on rugged terrain the markers may be obscured from the tractor operator by the rugged terrain. Lastly, if the markers have been placed well in advance of the plowing operation, the markers may be obscured by new grass growth, dirt or other objects. Therefore as the tractor operator navigates the right of way, the tractor operator continually has to observe the right of way to make sure that a marker is not overlooked.

In addition to paying attention to the plow at the front of the tractor, the tractor operator also has to pay attention to the cable being pulled behind the tractor. This cable is often expensive and may be damaged if the cable is tangled in the terrain. In addition, if the cable is tangled, time is lost in stopping the tractor, backing up, untangling the cable and realigning the cable in the trench.

During operation, a tractor operator has to look for markers in the front of the tractor to make sure that he does not damage any preexisting utility conveyance. In addition, the tractor operator has to be aware of the installation of the cable behind the tractor, so that avoidable problems can be detected. It is difficult for the operator to be aware of the markers in the front of the tractor and simultaneously observe the installation of the cable in the back of the tractor.

Thus there is a need in the art for a method or apparatus that enables a tractor operator to simultaneously observe the markers located in the front of the tractor and the cable installation occurring in the rear of the tractor. In addition, there is a need for a method and apparatus for locating markers that may have been obscured. Lastly, there is a need for a method and apparatus for locating a tractor plow, relative to a preexisting utility conveyance, during tractor operations.

SUMMARY OF THE INVENTION

In the method and apparatus of the present invention, a system is presented which displays a trajectory of demarcation points positioned in front of a tractor and simultaneously displays the location of a plow positioned in the rear of the tractor. As such, a tractor operator is able to steer the tractor along an engineered path and simultaneously install a utility conveyance.

Sensors are placed in the front of the tractor and a plow locator is placed in the rear of the tractor. The sensors detect demarcation points, which denote the location of a preexisting utility conveyance or the boundaries of a right of way. The demarcation points are then communicated to a monitor system within the operator compartment of the tractor. The monitor system includes a display screen. Information on the demarcation points is communicated from the sensors to the monitor system. A trajectory defined by the demarcation points, is then displayed on the screen for viewing.

The plow locator is used to determine the position of the plow. Plow location information is communicated from the plow locator on the plow, to the monitor system. As such, the location of the plow may also be shown on the screen.

As a result of the trajectory of demarcation points that are shown on the screen and the location of the plow, which is also displayed on the screen; an operator is able to determine the location of the plow relative to the right of way and any preexisting utility conveyance. As a result of the foregoing, during operation, the operator may steer the tractor along an engineered path while observing the screen. This will allow the operator to observe the proximity of the plow, to the utility conveyance, during digging operations.

In one embodiment of the present invention a system comprises a sensor sensing demarcation points and generating sensing signals; a locator generating locator signals which designate a location relative to the demarcation points; and a monitor system including a screen, the monitor system coupled to the sensor and coupled to the locator, the monitor system receiving the sensing signals from the sensor and receiving the locator signals from the locator, the monitor system displaying the demarcation points on the screen in response to the sensing signals and displaying the location relative to the demarcation points on the screen in response to the locator signals.

A method of displaying a path comprises the steps of operating at least one sensor generating sensing information, the sensing information designating demarcation points; operating a plow locator generating plow location information, the plow location information designating a location of a plow relative to the demarcation points; and displaying a path in response to the sensing information and in response to the plow location information.

A method of installing a utility conveyance comprises the steps of operating at least one sensor generating sensing information, the sensing information designating demarcation points; operating a plow locator generating plow location information, the plow location information designating a location of a plow relative to the demarcation points; displaying a trajectory of demarcation points in response to the sensing information; displaying the location of the plow relative to the demarcation points; and operating a vehicle which installs a utility conveyance in response to displaying the trajectory of demarcation points and in response to displaying the location of the plow relative to the demarcation points.

DESCRIPTION OF THE INVENTION

Figure 1:
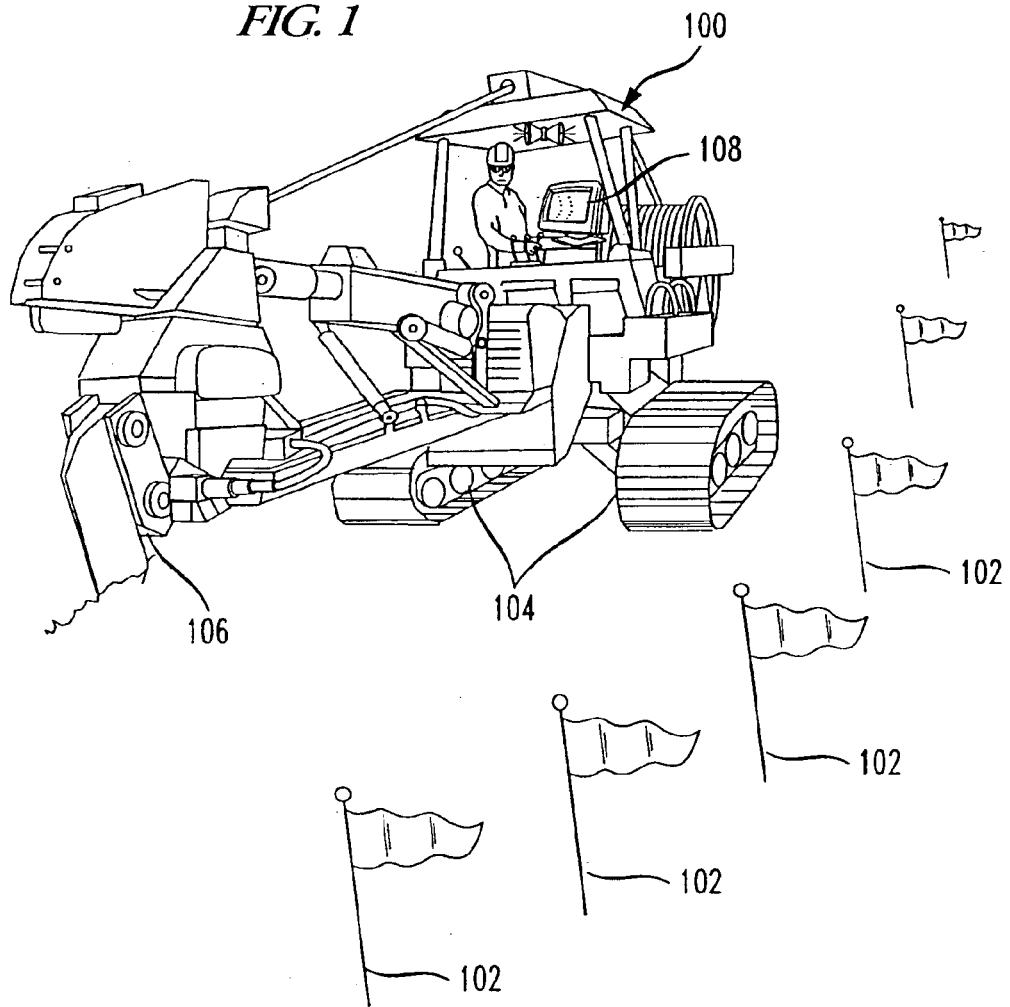
FIG. 1 displays a tractor implementing the method and apparatus of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention is directed to a method and apparatus for installing a utility conveyance. A utility conveyance, which includes piping and fiber cables, may be installed by a variety of methods. Cable plow installation is one of these methods. However, it should be appreciated that the teachings presented, may be extended to other cable installation methods.

In cable plow installation a plow is used to dig a trench along a right of way. Cabling such as a fiber cable is then pulled behind the plow and placed into the trench. Using this type of operation an operator may be able to install many miles of fiber optic cable per day.

Prior to beginning a cable plow operation the path for the utility conveyance must be designed and marked by demarcation points that can be detected by a tractor operator. In addition, any preexisting utility conveyance has to be located and marked. The marking is used to define a pathway for the tractor operator. In addition, the marking alerts the tractor operator of locations to avoid. The marking is accomplished by placing small metal wires with flags attached, throughout a right of way, as demarcation points. These flags are placed in easily identifiable locations and may be colored with fluorescent color or some other type of color designation, so that the operator can easily distinguish them from the terrain. In the method and apparatus of the present invention, a metal detecting device such as a sensor is located on the tractor. The sensor is used to locate the demarcation points.

In addition, tone-generating devices are often placed within the utility conveyance. The tone-generating devices send out standardized tones so that using an apparatus, a tractor operator is able to detect the tones and avoid cables transmitting the tones. A discussion of the method and apparatus for detecting the location of a utility conveying in this manner is presented in U.S. Pat. No. 5,557,258, entitled Method and Apparatus for warning of potential harm to an underground utility conveyance, issued on Sep. 17, 1996, which is herein incorporated by reference. Specific tones are typically assigned to public and private utility companies and as a result, once detected, in addition to determining that a utility conveyance is present, it is possible to determine the company that is responsible for the utility conveyance. In the method and apparatus of the present invention an audio sensor such as a tone-detecting device may also be placed on the tractor. The tone-detecting device may then listen for tones generated by the tone-generating device during tractor operation and alert an operator to a preexisting utility conveyance.

In the method and apparatus of the present invention sensors are positioned to detect the metal flags and/or the tone generating devices. Both the metal flags and the tone generating devices may be used to identify an appropriate pathway for a tractor operator or identify a preexisting utility conveyance that the tractor operator should avoid. As such, the metal flags and the tone-generating devices serve as demarcation points.

As mentioned previously, a right of way is identified as a pathway along which a company has acquired the right to install a utility conveyance. In addition, a number of demarcation points (e.g. trajectory) may be defined, where each demarcation point is associated with a metal flag or a tone-generating device. The right of way may define a large area and the trajectory of demarcation points may define a smaller pathway within the right of way. In order to install a utility conveyance, a new path must be defined which is within the boundary of the right of way, but avoids the trajectory of demarcation points. The new path is referred to as an engineered path. The engineered path would include a pathway along which a tractor operator must navigate a tractor to put in a new utility conveyance or may include a path along which the new utility conveyance should be placed.

During the cable installation process, the tractor operator may drive the tractor along an engineered path while pulling the cable behind. The tractor operator attempts to keep the plow in line with the engineered path while avoiding any preexisting utility conveyance that is within the right of way.

In the method and apparatus of the present invention, the tractor is equipped with sensors. The sensors may be located on the front of the tractor, on the left and right side of the tractor or extended out beyond the front of the tractor in an extension apparatus. The position and the location of the sensor is designed and coordinated to provide information on the demarcation points. The sensors are tuned-coils that are used to detect the metal flags and/or electronic tones. The sensors are connected to a monitor system. The sensors communicate sensing information to the monitor system. The sensing information is used by the monitor system to determine the relative position of the demarcation points.

The monitor system is typically located in the compartment of the tractor, however, it should be appreciated that the monitor system may be located in a variety of locations. For example, the monitor system may be located in another area of the tractor or the monitor system may be implemented in a portable device that is located outside of the tractor. In addition, the monitor system may be a portable unit, which communicates with a second unit located in a facility.

In the method and apparatus of the present invention, the connection between the sensors and the monitor system may be a physical connection (e.g. cabling) or a wireless connection. Further, the monitor system includes a screen. During operation, the locations of the demarcation points are shown on the screen. The demarcation points which are shown on the screen form a trajectory that may be used by an operator to navigate the engineered path. During operation, this enables the operator to avoid preexisting utility conveyances, as the tractor proceeds along the engineered path.

In addition, the tractor is equipped with a plow locator on the rear of the tractor that tracks the location of the plow. The plow locator is a position location device. The plow locator detects the location of the plow in relation to the tractor and communicates plow location information to the monitor system. As such, the position of the plow relative to the demarcation points is displayed to the operator, on the screen. Since a trajectory of demarcation points are located on the screen and the location of the plow is displayed on the screen, in one method of the present invention, an operator is able to use the images or indications displayed on the screen, to navigate an engineered path.

The position of the plow is oriented relative to the utility conveyance by calibrating the plow locator relative to the sensors. Prior to operation, the sensors and plow locator are calibrated relative to each other. Therefore when the sensor senses a demarcation point, the sensor transmits sensing information back to the monitor system. Using the sensing information the monitor system will be able to detect the distance of the demarcation point from the sensors and displays information on a screen that represents the spatial distance of the sensors from the demarcation point. In addition, since the plow locator has been calibrated relative the sensors, the monitor system will be able to calculate the relative position of the plow locator to the demarcation points. Ultimately, since the relative position of the plow locator to the plow is known, the monitor system is able to compute and may display; the relative position of the plow locator to the demarcation points on the screen of the monitor system.

During the operation of the method and apparatus of the present invention, a tractor is set in motion and moved along an engineered path or in the alternative the operator defines the engineered path during operation. A tractor operator that has access to the screen associated with the monitor system, controls the tractor. As mentioned previously, the tractor is equipped with sensors. As the sensors approach metal flags, the sensors function as metal detectors and locate the metal flags. As the tractor approaches a utility conveyance, which has a tone-generating device that produces emanating tones, the sensors tune into the frequency of the emanating tones and are able to identify the location of a utility conveyance based on the emanating tones.

Once the sensors have identified a metal flag or emanating tones, the sensors generate sensing signals that are then communicated back to the monitor system located in the operator compartment of the tractor. The monitor system generates display signals that produce a display, which is shown on the screen associated with the monitor system. The metal flags and emanating tones are displayed on the operator screen in a manner that enables the tractor operator to discern the location of the various metal flags or emanating tones. As a result, the boundaries of the right of way and/or a preexisting utility conveyance may be ascertained.

The operator screen may show the demarcation points as a two-dimensional representation, a three-dimensional representation or alert the operator with a sound warning. In addition a combination of visual and sound warnings may be used to alert the operator to demarcation points.

As mentioned previously, the plow includes a position locator. The position locator generates plow location information that denotes the location of the plow in relation to the tractor. The plow locator may be a sensing device or some other type of signaling device. The plow locator generates plow location information and communicates this information to the monitor system in the operator compartment. The communication may be through a wired connection or through a wireless connection. As a result, the position of the plow will also be displayed on the screen. As a result of the foregoing, the tractor (e.g. cable plow) operator is able to locate both the trajectory of the demarcation points and the location of the plow relative to the demarcation points.

With the right of way marked and flagged and any preexisting utility conveyance marked and flagged, the tractor operator may operate the plow to bury the fiber optic cable along an engineered path. The tractor operator will observe the screen of the monitor system while driving the tractor down the engineered path. As the tractor travels down the engineered path, the sensors will detect the metal flags and any cable locating tones. The sensors then communicate sensing signals to the monitor system. The plow locator on the rear of the tractor communicates plow location information. A plow detector located in the monitor system will then calculate the position of the plow in relation to the tractor and in relation to the demarcation points. The trajectory of demarcation points, as well as the location of the plow, are displayed on the screen of the monitor system. As a result, the tractor operator may use the information on the screen to navigate and operate the tractor, as the tractor moves along an engineered path.

Should the tractor, veer off to the left, right or get too close to an existing utility conveyance, an alarm will sound to notify the cable operator. In addition, if the tractor moves off the proposed engineered path, then an additional alarm may sound.

FIG. 1 displays a tractor 100 implementing the teachings of the present invention. A trajectory of demarcation points are shown as 102. The demarcation points 102 may be metal flags or may be positions identified by tone generating devices which are generating locating tones. Sensors are shown as 104. The sensors 104 are either implemented as metal detectors or as listening devices that listen and receive the locating tones. In the alternative the sensors may be a combination of detectors and listening devices. A plow locator is shown as 106. The plow locator 106 is used to locate the position of the plow, relative to the demarcation points 102, denoted by the flags and locating tones.

The sensors 104 and the plow locator 106 are both connected to a monitor system 108. The monitor system 108 receives sensing signals from the sensors 104 and plow location information from the plow locator 106. The monitor system 108 includes a screen. The trajectory of the demarcation points 102 are displayed on the screen. In addition, the position of the plow relative to the demarcation points is also displayed on the screen.

Figure 2:
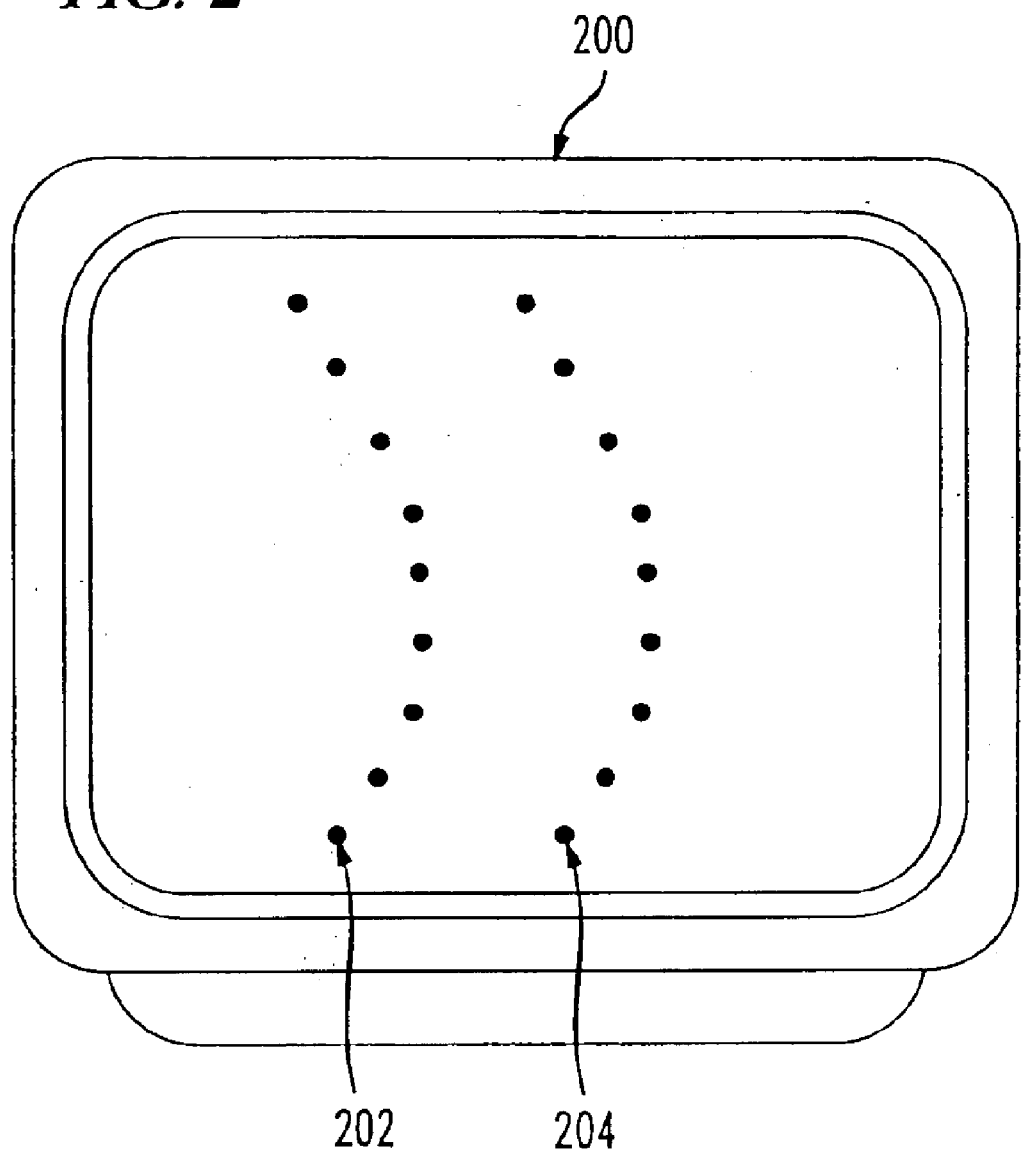
FIG. 2 displays a screen implementing the method and apparatus of present invention.

FIG. 2 is a graphical representation of a screen 200 discussed in association with the monitor system 108 of FIG. 1. The screen 200 displays a trajectory of the demarcation points denoted as 202. In addition the screen 200 includes locations of the plow 204 shown at different times. Using the screen 200 presented in FIG. 2, a tractor operator is able to both navigate the driving of the tractor and control the operation of the plow, without disrupting a preexisting utility conveyance.

Figure 3:
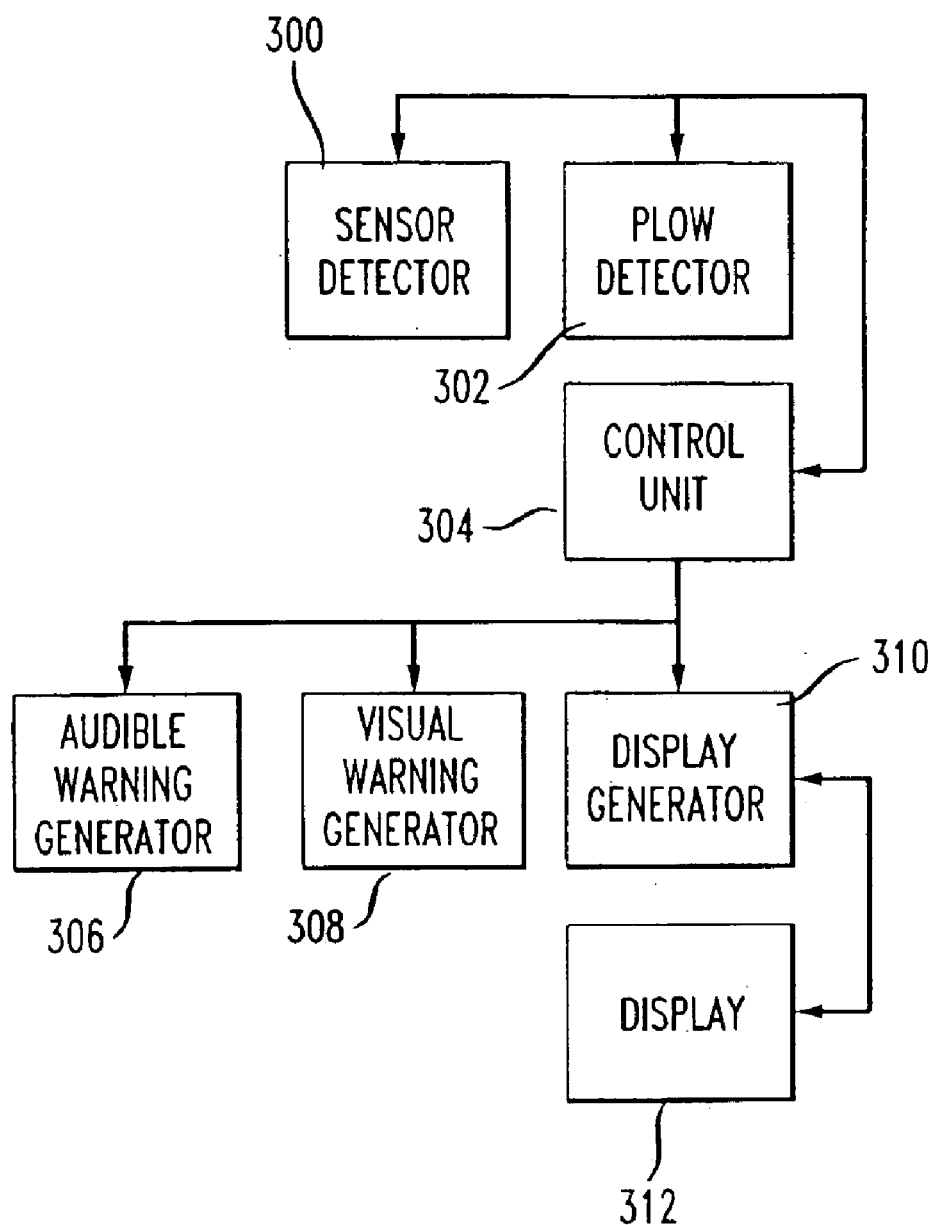
FIG. 3 displays a block diagram of a monitor system implementing the method and apparatus of the present invention.

FIG. 3 is a block diagram of the monitor system presented in FIG. 1. A sensor detector is shown as 300. A sensor detector either detects a metal flag denoting a demarcation point or receives signaling information that denotes a demarcation point, from a tone-generating device. A plow detector is shown as 302, the plow detector receives the plow location information generated by the plow locator and determines the position of the plow. A control unit is shown as 304, the control unit 304 receives information from the various inputs and produces coordinated output information. The output information is generated and sent to an audible warning device 306, a visual warning device 308 or a display generator 310. The display generator 310 produces the signals and information that will be shown on a screen 312.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for monitoring a utility conveyance comprising:

a sensor sensing demarcation points and generating a sensing signal, wherein the sensing signals are generated in response to receiving tone-generating signals from a tone-generation device;

a locator generating locator signals which designate a location relative to the demarcation points; and a monitor system including a screen, the monitor system coupled to the sensor and coupled to the locator, the monitor system receiving the sensing signals from the sensor and receiving the locator signals from the locator, the monitor displaying the demarcation points on the screen in response to sensing signal and displaying the location relative to the demarcation points on the screen in response to the locator signals.

2. A system as set forth in claim 1, wherein the system is implemented on a tractor.

3. A system as set forth in claim 1, wherein the locator is a plow locator and the locator signals designate a location of a plow relative to the demarcation points.

4. A method of displaying a path comprising the steps of:

operating at least one sensor generating sensing information, the sensing information designating demarcation points, wherein the sensing information is generated in response to receiving tone-generating signals from a tone-generation device;

operating a plow locator generating plow location information, the plow location information designating a location of a low relative to the demarcation points; and displaying a path in response to the sensing information and in response to the plow location information.

5. A method as set forth in claim 4, wherein the path is an engineered path.

6. An apparatus for displaying a path comprising:

means for operating at least one sensor generating sensing information, the sensing information designating demarcation points, wherein the sensing information is generated in response to receiving tone-generating signals from a tone-generation device;

means for operating a plow locator generating plow location information, the plow location information designating a location of a plow relative to the demarcation points; and means for displaying a path in response to the sensing information and in response to the plow location information.

7. A method of installing a utility conveyance comprising the steps of:

operating at least one sensor generating sensing information, the sensing information designating demarcation points, wherein the sensing information is generated in response to receiving tone-generating signals from a tone-generation device;

operating a plow locator generating plow location information, the plow location information designating a location of a plow relative to the demarcation points;

displaying a trajectory of demarcation points in response to the sensing information;

displaying the location of the plow relative to the demarcation points; and operating a vehicle which installs a utility conveyance in response to displaying the trajectory of demarcation points and in response to displaying the location of the plow relative to the demarcation points.

* * * * *